3,084,027
CLARIFICATION OF PHOSPHORIC ACID
Clinton A. Hollingsworth, Lakeland, and Manuel A. Diaz, Tampa, Fla., assignors to Smith-Douglass Company, Incorporated, Norfolk, Va., a corporation of Virginia
Filed July 1, 1960, Ser. No. 40,322
10 Claims. (Cl. 23—165)

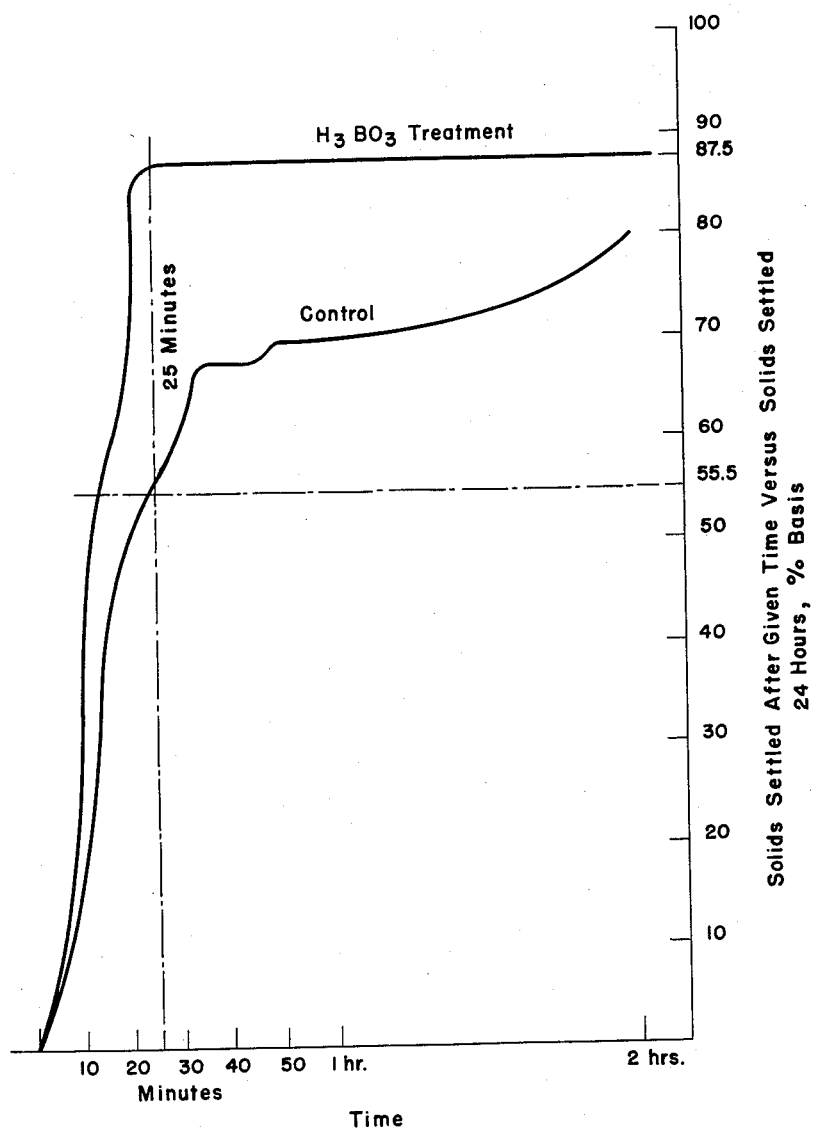

This invention relates to the production of phosphoric acid, and more particularly to a process for clarifying phosphoric acid produced by the acidulation of phosphate rock and similar calcium phosphate-containing materials.

Wet process phosphoric acid is produced by the acidulation of naturally occurring phosphatic materials with sulfuric acid, the resulting dilute phosphoric acid being separated from the insoluble products of the acidulation reaction by filtration or the like and, if desired, being concentrated to obtain a concentrated phosphoric acid product. The phosphatic raw material usually is composed predominantly of calcium phosphates, and the acidulation reaction produces a large quantity of calcium sulfate suspended and dissolved in the dilute phosphoric acid product. Calcium sulfate is relatively insoluble in phosphoric acid and most of it can be removed by filtration of the dilute acid product. However, an appreciable amount of the calcium sulfate remains in solution, and as the dilute acid product is cooled to room temperature, or is concentrated and then cooled, precipitation of calcium sulfate takes place. It would ordinarily be expected that a final filtration or clarification of the phosphoric acid product, whether dilute or concentrated, would remove all of the precipitated calcium sulfate, and that the clarified acid could then be stored, shipped and processed without further precipitation of calcium sulfate. However, for reasons that are not entirely understood calcium sulfate continues to precipitate from the cooled and clarified phosphoric acid product, whether dilute or concentrated, for a long period of time after final clarification thereof. The crystals precipitated from the supposedly clear acid eventually settle out of the acid and deposit in hard formations on the walls and pipe lines of process equipment, in transportation facilities and in apparatus employed in the manufacture of other products from the acid.

The persistent precipitation of calcium sulfate from filtered wet process phosphoric acid is a costly and sometimes crippling disadvantage which limits the usefulness of the wet process acid. However, despite the efforts of many different investigators to discover ways or means by which this persistent precipitation of calcium sulfate can be prevented or at least reduced, heretofore there has been no known practical way to alleviate this situation. In an effort to overcome this serious disadvantage of wet process phosphoric acid, we have conducted an intensive investigation of the problem of controlling the precipitation of calcium sulfate. As a result of our investigation we have made the surprising discovery that a clear phosphoric acid product substantially free from the aforementioned persistent precipitation of calcium sulfate crystals can be produced by the wet process if a minute amount of certain boroon compounds is incorporated in the digestion mixture of the phosphatic raw material and sulfuric acid. Moreover, it has been found that the addition of the boron compound to the digestion mixture somehow affects the crystal form of the calcium sulfate precipitate so as to markedly improve the filtration of the slurry of dilute acid and gypsum.

Specifically, our new process for producing clear phosphoric acid by the acidulation of calcium phosphates with sulfuric acid comprises incorporating a water-soluble or acid-soluble inorganic boron compound in the digestion mixture of calcium phosphate and sulfuric acid, the amount of the boron compound in the mixture being such that the mixture contains at least about 0.00005%, and preferably between about 0.0001 and 0.005%, by weight of boron based on the calcium content (calculated as CaO) of the mixture. Upon completion of the digestion operation the resulting slurry of phosphoric acid and calcium sulfate is filtered to recover a clear phosphoric acid product substantially free of crystals of calcium sulfate. The filtered dilute phosphoric acid product will remain substantially free of subsequently precipitated calcium sulfate for an indefinite period of time. In addition, the dilute filtered acid can be concentrated and the concentrated acid clarified or filtered to remove calcium sulfate precipitated as a result of the concentration operation to obtain a clear concentrated phosphoric acid product that will remain indefinitely substantially free of subsequently precipitated calcium sulfate crystals. Moreover, in the past a small but appreciable portion of the calcium sulfate precipitate would often pass through the pores of the filter to the obvious detriment of the filtered acid product, and after a filter had been in use for a period of time its pores often became clogged or "blinded" with gypsum with a resulting decrease in the efficiency of the filtration operation. Now, as a result of our process substantially all of the calcium sulfate precipitate is retained on the filter and there is a marked reduction in the occurrence of blinding of the filter with gypsum. Moreover, the wear and abrasion by the precipitate of pumps, valves and other auxiliary equipment is substantially reduced.

In the practice of our invention a very small amount of an inorganic water- or acid-soluble boron compound is added to the usual digestion mixture of sulfuric acid and phosphatic raw material, the product of the digestion reaction then being filtered, concentrated, cooled and/or clarified in the usual manner to obtain a phosphoric acid product that will remain substantially free from subsequent precipitation of crystals of calcium sulfate for an indefinite period of time. It is not understood in what way the addition of the boron compound to the digestion mixture acts to control the precipitation of calcium sulfate so as to substantially prevent the precipitation of crystals of gypsum from the clarified acid product. The amount of boron added to the digestion mixture is so small as to preclude the possibility that the boron somehow reacts or combines with any appreciable portion of the calcium sulfate to form a new and more readily filtered compound or precipitate. Microscopic examination of the crystals of calcium sulfate that are retained on the filter and of the crystals that later precipitate from the filtered acid has shown that in the case of untreated acid the filter cake is composed predominantly of rhomboidal crystals of varying sizes along with a few needle-like crystals of gypsum while the solids recovered from the filtered acid are predominantly long fine needle crystals with a few small rhomboidal crystals intermixed therewith, whereas in the case of acid treated in accordance with our process the filter cake is composed predominantly of clusters of small rhomboidal crystals while the few solids that subsequently precipitate in the filtered acid are predominantly small rhomboidal crystals of gypsum. Therefore, it is probable that the added boron compound acts as a crystal modifier or "catalyst" which promotes the growth of rhomboidal crystals of calcium sulfate and which inhibits the growth of long fine needle crystals of calcium sulfate.

The amount of the boron compound added to the digestion mixture is such that the mixture contains at least about 0.00005%, and preferably between about 0.0001 and 0.005%, by weight of boron based on the calcium content (calculated as CaO) of the mixture.

When the boron content of the digestion mixture is less than about 0.00005% by weight of the CaO content thereof, the effectiveness of the added boron compound as a crystal modifier falls off sharply. On the other hand the addition of boron in excess of about 0.005% by weight of the lime content of the mixture does not result in any observable improvement in the clarity or freedom from calcium sulfate precipitation of the phosphoric acid product, and therefore while greater boron additions can be employed without deterimental effect no benefit commensurate with the added cost of the extra boron compound is achieved.

The boron compounds that are useful in our process are the inorganic water-soluble or acid-soluble compounds of boron such as the inorganic boron acids, acid anhydrides and their salts, and we have successfully employed such diverse boron compounds as boric acid ($H_3BO_4$), fluoboric acid ($HBF_4$), potassium fluoborate ($KBF_4$), sodium tetraborate (borax—$Na_2B_4O_7$), potassium tetraborate ($K_2B_4O_7$), sodium perborate ($NaBO_3$), metaboric acid (boron trioxide—$B_2O_3$) and the like in the practice of our invention. We found that the compounds of fluorine and boron, for example, the fluoborates, are particularly effective in producing a clear phosphoric acid product. The phosphatic raw materials from which wet process acid is made almost invariably contain small amounts of combined fluorine, and therefore it is possible that when boron compounds that contain no fluorine, e.g. boric acid or borax, are employed in our process the boron compound reacts with the fluorine already present in the digestion mixture to form, say, a fluoborate that possesses the desired crystal modifying effect upon the calcium sulfate precipitate.

The following examples are illustrative but are not limitative of the practice of our invention.

EXAMPLE I

A slurry was prepared from 2000 grams of phosphate rock containing 34.84% by weight $P_2O_5$ and 48.58% by weight CaO and 2000 grams of dilute phosphoric acid containing 20.33% by weight $P_2O_5$. To this slurry was added 1750 grams of sulfuric acid in the form of dilute acid containing 40% by weight $H_2SO_4$ and 0.3 gram of potassium fluoborate in the form of an aqueous solution containing 0.3% by weight of $KBF_4$. The amount of potassium fluoborate added to the digestion mixture was 0.029% by weight of the CaO content of the phosphate rock, this being equivalent of 0.0026% by weight of boron based on the CaO content of the rock. The mixture was allowed to digest, with constant agitation, for four hours. Upon completion of the digestion operation the slurry was filtered and dilute phosphoric acid containing 22.32% by weight $P_2O_5$ recovered. A portion of the filter acid was concentrated to obtain a phosphoric acid product containing 52.82% by weight $P_2O_5$. The analysis of the dilute filter acid and the concentrated acid are reported in the following table:

*Table 1*

|  | $P_2O_5$, wt. percent | CaO, wt. percent | Total $SO_4$, wt. percent | Free $SO_4$, wt. percent |
|---|---|---|---|---|
| Filter acid | 22.32 | 0.19 | 5.51 | 5.18 |
| Concentrated acid | 52.82 | 0.42 | 12.43 | 11.71 |

The filter acid and the concentrated acid were stored and observed at ambient temperature for a period of over two months. No solids dropped out of the filter acid during this period, in contrast to the persistent precipitation of calcium sulfate from dilute wet process acid produced by the prior art practice. The concentrated acid contained a small amount of suspended solids as a result of the concentration operation. However, these calcium sulfate crystals did not deposit on and adhere to the bottom and sides of the container as do the crystals which precipitate from untreated phosphoric acid.

The crystals of calcium sulfate retained on the filter and those suspended in the concentrate acid were subjected to microscopic examination. In both cases these were found to comprise predominantly rectangular crystals whose length were three to four times their width. Unlike the rhomboidal crystals ordinarily found in untreated samples of phosphoric acid these crystals did not have the dark border which is indicative of thick crystals, and there were very few long needle crystals in contrast with the relatively large number of such crystals ordinarily found in untreated samples of filtered wet process acid.

EXAMPLE II

A series of tests was conducted to determine the optimum concentration of potassium fluoborate necessary to produce the clearest phosphoric acid product. Eleven test samples of dilute phosphoric acid were prepared in the following manner: For each test sample, a slurry was prepared from 100 grams of phosphate rock (34.84% $P_2O_5$, 48.58% CaO) and 100 grams of dilute phosphoric acid (20.33% $P_2O_5$). The slurry was digested with 85 grams of sulfuric acid, added as a solution containing 40% by weight $H_2SO_4$. Two of the test samples were used as controls to which no potassium fluoborate was added. Varying amounts of potassium fluoborate were added to each of the remaining nine test samples, the compound being added to the digestion mixture in the form of an aqueous solution containing 0.1% by weight $KBF_4$ at the same time that the sulfuric acid was added thereto. In each case the mixture was allowed to digest for two hours with constant agitation. On completion of the digestion operation the slurry was filtered and dilute phosphoric acid recovered for analysis and visual comparison with the other test samples of acid. The amount of potassium fluoborate employed, the calcium and sulfuric acid content, and the relative clarity of each test sample is reported in the following table. For comparative purposes, the analytical data has been corrected to correspond to a $P_2O_5$ content of 25%.

*Table 2*

| $KBF_4$, percent of CaO | B, percent of CaO | CaO, wt. percent | Total $SO_4$, wt. percent | Free $SO_4$, wt. percent | Clarity |
|---|---|---|---|---|---|
| Control | 0 | 0.39 | 2.42 | 1.74 | turbid. |
| Control | 0 | 0.42 | 4.15 | 3.43 | Do. |
| 0.00036 | 0.00003 | 0.46 | 3.36 | 2.66 | Do. |
| 0.0007 | 0.00006 | 0.42 | 2.94 | 2.23 | good. |
| 0.0018 | 0.00015 | 0.64 | 4.17 | 3.03 | very good. |
| 0.0036 | 0.00031 | 0.45 | 4.21 | 3.44 | Do. |
| 0.0072 | 0.00062 | 0.33 | 3.33 | 2.76 | Do. |
| 0.0144 | 0.00124 | 0.38 | 4.59 | 3.94 | Do. |
| 0.0288 | 0.00247 | 0.22 | 4.11 | 3.73 | Do. |
| 0.0288 | 0.00247 | 0.37 | 4.07 | 3.44 | Do. |
| 0.0574 | 0.00493 | 0.46 | 2.97 | 2.14 | Do. |

The test samples were stored and observed for a period of two months. The two control samples and the test sample containing 0.00036% $KBF_4$ (CaO basis) were turbid and contained an appreciable amount of fine crystals of calcium sulfate suspended therein and deposited on the walls of the container. The test samples containing from 0.0007% to 0.0114% $KBF_4$ inclusive contained very little, if any, suspended solids, and these solids did not deposit on and adhere to the walls and bottoms of the acid containers. The test samples containing 0.0288% and 0.0574% $KBF_4$ remained perfectly clear of all apparent solids for the entire period of observation.

Microscopic examination of the calcium sulfate crystals retained on the filter and recovered from the filtered acid disclosed that the crystals from the test samples produced in accordance with our invention were predominantly rectangular with virtually no needle-like crystals intermixed therewith.

EXAMPLE III

A series of tests was conducted to determine the effectiveness of various boron compounds in the production of clear phosphoric acid. The test procedure was essentially the same as that described in Example II except for the specific boron compounds employed and the amounts of these compounds added to the digestion mixture.

Fifteen test samples were prepared in the manner described and five different boron compounds, each employed in three different concentrations, were evaluated. The compounds evaluated were fluoboric acid ($HBF_4$), sodium tetraborate (borax—$Na_2B_4O_7$), potassium tetraborate ($K_2B_4O_7$), sodium perborate ($NaBO_3$) and metaboric acid (boron trioxide—$B_2O_3$). Except for sodium perborate these compounds were added to the digestion mixture in the form of 0.1% aqueous solutions. Measured amounts of each compound were added to each of three test samples so that the samples contained respectively 0.1%, 0.01% and 0.001% by weight of the particular boron compound based on the CaO content of the sample. The boron additions to the test samples are summarized in the following table:

Table 3

| Compound | Formula | Percent of CaO | Percent B of CaO |
|---|---|---|---|
| Fluoboric Acid | $HBF_4$ | 0.1 | 0.0123 |
|  |  | 0.01 | 0.0012 |
|  |  | 0.001 | 0.0001 |
| Sodium tetraborate (borax) | $Na_2B_4O_7$ | 0.1 | 0.0215 |
|  |  | 0.01 | 0.0022 |
|  |  | 0.001 | 0.0002 |
| Potassium tetraborate | $K_2B_4O_7$ | 0.1 | 0.0185 |
|  |  | 0.01 | 0.0019 |
|  |  | 0.001 | 0.0002 |
| Sodium perborate | $NaBO_3$ | 0.1 | 0.0132 |
|  |  | 0.01 | 0.0013 |
|  |  | 0.001 | 0.0001 |
| Metaboric Acid (Boron trioxide) | $B_2O_3$ | 0.1 | 0.0311 |
|  |  | 0.01 | 0.0031 |
|  |  | 0.001 | 0.0003 |

On completion of the digestion operations, the resulting slurries were filtered and the resulting filtered acid products stored and observed for a period of over one month. During this period the acid products all remained virtually free of calcium sulfate precipitation.

EXAMPLE IV

In a large scale test of our process, phosphate rock having an average CaO content of 50% by weight was introduced into a premix tank at the rate of approximately 16 tons of rock per hour, together with sufficient sulfuric acid to convert the phosphate rock to phosphoric acid and calcium sulfate. Boric acid in the form of an aqueous solution containing 4.54% by weight $H_3BO_4$ was also introduced into the premix tank at the rate of 0.6 pound of boric acid per hour, the amount of boron being added to the digestion mixture thus being 0.0007% by weight of the CaO content of the phosphate rock. Upon completion of the digestion operation the resulting slurry of phosphoric acid and calcium sulfate was filtered, and the filter acid was analyzed immediately after filtration and again after the acid had been allowed to stand and the solids suspended therein to settle for a period of 24 hours. Moreover, the rate at which solids settled from the filter acid was determined by periodically observing the volume of solids that settled in 100 milliliter samples of the acid during the 24 hour period. The analysis of the treated acid product and the rate at which the solids settled therefrom were compared with the results obtained for an untreated control acid produced under substantially the same conditions with the exception of the omission of the boron compound. In addition, a portion of the filter acid was concentrated and allowed to settle, and the settled concentrated acid was analyzed and the results compared with those obtained for untreated control acid of the same concentration.

The analysis of the untreated control acid and the acid treated in accordance with our invention are reported in the following table. (For comparative purposes, the analytical data has been corrected to correspond to a $P_2O_5$ content of 25% for dilute acid and 50% for concentrated acid.)

Table 4

|  | CaO, wt. percent | Total $SO_4$, wt. percent | Free $SO_4$, wt. percent | Solids, Vol. percent |
|---|---|---|---|---|
| Filter Acid: |  |  |  |  |
| control—unsettled | 0.4 | 2.82 | 2.10 | 0.95 |
| control—settled | 0.3 | 2.50 | 1.92 |  |
| treated—unsettled | 0.4 | 1.87 | 1.13 | 0.50 |
| treated—settled | 0.4 | 2.09 | 1.40 |  |
| Concentrated Acid: |  |  |  |  |
| control—settled | 0.14 | 4.10 | 3.77 |  |
| treated—settled | 0.07 | 2.92 | 2.79 |  |

The most significant data in the foregoing table is that relating to the percent of solids present in the control filter acid as compared with that present in the treated filter acid. The significantly lower amount of solids present in the unsetled treated filter acid indicates that a substantially greater portion of the gypsum precipitate is retained on the filter when the acid is produced in accordance with our process than when produced by the prior art practice.

The relative rates at which precipitated, suspended solids settled from the control filter acid and from the treated filter acid are also of interest, the relative settling rates of these two acids being shown graphically in the single FIGURE of the drawing. The settling rates were determined by observing the volume of solids that settled in 100 milliliter samples of the acid during the 24-hour period immediately following initial filtration of the acid. The total volume of solids that settled from the acid solutions in this 24 hour period has been arbitrarily chosen as 100%, and the volumes of solids settling in the acids at selected times prior to this are recorded in the accompanying graph as percents of this arbitrary 100%. During the entire period the samples were kept at the same uniform temperature to avoid the effects of temperature changes. From the graph it will be noted that at the end of 25 minutes about 87.5% of all of the solids that were going to settle from the treated filter acid had settled therefrom, whereas in the case of the untreated or control filter acid only 55.5% of the total amount of solids to be settled had settled from the acid solution at the end of this period of time. Therefore, it is evident that phosphoric acid produced in accordance with our invention will rapidly clarify following filtration and thus can be stored and shipped without further significant precipitation of solid matter after a nominal retention time in a settling tank.

Crystals of calcium sulfate recovered from the two slurries (i.e., control and treated) prior to filtration, crystals retained on the filters and crystals recovered from the filtered acids were subjected to microscopic examination. In the case of the control acid the slurry contained approximately equal amounts of rhomboidal crystals and fine needle crystals of various sizes, the filter cake was predominantly rhomboidal crystals of varying sizes along with a few needle crystals, and the solids recovered from the filtered acid were predominantly long fine needle crystals with a few small rhomboidal crystals mixed therewith. In the case of the treated samples, both the slurry and filter cake consisted predominantly of oval clusters of small rhomboidal crystals, and the solids recovered from the filtered acid were predominantly small rhomboidal crystals with very few needle crystals intermixed therewith. It appears from this examination that the crystals which penetrate the filter cloth are primarily fine needle-shaped crystals. Thus, by reducing the relative amount of this type of crystal more of the gypsum is retained on the filter and, as shown in the accompanying graph, those crystals which do pass through the cloth settle out more quickly from the acid solution. Moreover, it was found that when boric acid-treated phosphoric acid is concentrated some gypsum settles therefrom but in somewhat lesser quantities than untreated phosphoric acid, and those crystals which do form settle out rapidly.

EXAMPLE V

An 89 hour test run of our process was conducted at a commercial phosphoric acid plant.

In normal operation the phosphoric acid plant continuously processes about 16,000 pounds of phosphate rock per hour, the rock having an average CaO content of 50% by weight. During the test run 0.3 pound per hour of boric acid was added to the reaction mixture of phosphate rock and sulfuric acid, the boric acid being added to the mixture in the premix tank in the form of a dry solid at the rate of 0.15 pound per half hour. Thus, the amount of boron added to the digestion mixture was 0.0007% by weight of the CaO content of the rock. The reaction product slurry consisting essentially of phosphoric acid and calcium sulfate was filtered and the filter acid was clarified in the usual manner to obtain an acid product containing about 30.4% by weight $P_2O_5$.

At half hour intervals during the duration of the test, 100 milliliter samples of the filter acid were centrifuged for three minutes to determine the solid content of the filter acid prior to clarification. The solid content of the clarified acid was also determined in the same manner at less frequent intervals. The solids content of the filter acid at the beginning of the test run averaged slightly over 2% and at the end of the test run averaged approximately 0.5%—representing a reduction of more than 75% in the solid content of the filter acid. The solids content of the acid leaving the clarifier was approximately 0.3% at the beginning of the test and at the end of the test averaged approximately 0.15%—representing a reduction of about 50% in the solids content of the clarified acid. The results of the test run are summarized in the following table:

*Table 5*

| Time, hours | Percent Solids Filtrate | Percent Solids Clarified Acid |
|---|---|---|
| 0 | 2.1 | 0.3 |
| 4 | 1.7 | |
| 8 | 1.7 | 0.29 |
| 12 | 1.6 | |
| 16 | 1.8 | |
| 20 | 1.7 | |
| 24 | 1.6 | |
| 28 | 1.4 | |
| 32 | 1.2 | |
| 36 | 1.1 | |
| 40 | 1.3 | |
| 44 | 0.5 | |
| 48 | 0.6 | 0.15 |
| 52 | 0.8 | |
| 56 | 0.7 | 0.15 |
| 60 | 0.7 | |
| 64 | 0.6 | |
| 68 | 0.6 | |
| 72 | 0.7 | |
| 76 | 0.7 | |
| 80 | 0.7 | |
| 84 | 0.5 | |
| 89 | 0.4 | 0.15 |

On completion of the foregoing test run, the addition of boric acid to the digestion mixture was continued, the boric acid being added to the premix tank as a dry solid at the rate of 0.15 pound of acid per half hour. After the boric acid had been employed in the ordinary commercial production of phosphoric acid for a period of approximately thirty days, examination of the strong filtrate receivers indicated a substantial decrease in the amount of solids salting out from the product acid in this equipment. A substantial improvement in filter cloth operation was also observed during the thirty-day period. The same set of filter cloths were used continuously without any intervening cleaning of these cloths. Formerly, in normal operation, the cloths had to be cleaned approximately every ten to twelve days due to the blinding of the cloths with gypsum.

From the foregoing description of our new process for producing clear phosphoric acid it will be seen that we have made an important contribution to the art to which our invention relates.

We claim:

1. Process for producing clear phosphoric acid which comprises digesting calcium phosphate with sulphuric acid in the presence of a boron compound selected from the group consisting of the inorganic boron acids, boron acid anhydrides and their salts, the amount of said boron compound being such that the digestion mixture contains at least about 0.00005% by weight of boron based on the calcium content (calculated as CaO) of the mixture, whereby the calcium sulfate produced as a result of said digestion predominantly is in the form of small rhomboidal crystals with few needle crystals intermixed therewith, and filtering the product of the digestion reaction to recover clear phosphoric acid substantially free of subsequently precipitated crystals of calcium sulfate.

2. The process according to claim 1 in which the amount of said boron compound incorporated in the digestion mixture is such that the boron content of the mixture is between about 0.0001 and 0.005% by weight of the calcium content (calculated as CaO) thereof.

3. The process according to claim 1 in which the boron compound is potassium fluoborate.

4. The process according to claim 1 in which the boron compound is boric acid.

5. The process according to claim 1 in which the boron compound is borax.

6. Process for producing clear phosphoric acid which comprises digesting calcium phosphate with sulphuric acid in the presence of a boron compound selected from the group consisting of the inorganic boron acids, boron acid anhydrides and their salts, the amount of said boron compound being such that the digestion mixture contains at least about 0.00005% by weight of boron based on the calcium content (calculated as CaO) of the mixture, whereby the calcium sulfate produced as a result of said digestion predominantly is in the form of small rhomboidal crystals with few needle crystals intermixed therewith, filtering the product of the digestion reaction to recover clear dilute phosphoric acid, and concentrating the filtered dilute phosphoric acid to recover a concentrated phosphoric acid product substantially free of subsequently precipitated crystals of calcium sulfate.

7. The process according to claim 6 in which the amount of said boron compound incorporated in the digestion mixture is such that the boron content of the mixture is between about 0.0001 and 0.005% by weight of the calcium content (calculated as CaO) thereof.

8. The process according to claim 6 in which the boron comopnd is potassium fluoborate.

9. The process according to claim 6 in which the boron compound is boric acid.

10. The process according to claim 6 in which the boron compound is borax.

References Cited in the file of this patent
UNITED STATES PATENTS
2,929,777  Clevenger _____ Mar. 22, 1960